(12) United States Patent
Rav-Acha et al.

(10) Patent No.: US 9,363,431 B2
(45) Date of Patent: Jun. 7, 2016

(54) METHOD AND SYSTEM FOR CAPTURING IMPORTANT OBJECTS USING A CAMERA BASED ON PREDEFINED METRICS

(71) Applicant: MAGISTO LTD., Nes-Ziona (IL)

(72) Inventors: Alexander Rav-Acha, Rehovot (IL); Oren Boiman, Sunnyvale, CA (US)

(73) Assignee: MAGISTO LTD., Nes-Ziona (IL)

( * ) Notice: Subject to any disclaimer, the term of this patent is extended or adjusted under 35 U.S.C. 154(b) by 0 days.

(21) Appl. No.: 14/736,272

(22) Filed: Jun. 11, 2015

(65) Prior Publication Data

US 2015/0281566 A1    Oct. 1, 2015

Related U.S. Application Data

(63) Continuation-in-part of application No. 14/329,377, filed on Jul. 11, 2014.

(60) Provisional application No. 61/844,924, filed on Jul. 11, 2013.

(51) Int. Cl.
*H04N 5/222* (2006.01)
*H04N 5/232* (2006.01)
*G06K 9/00* (2006.01)
*H04N 5/235* (2006.01)

(52) U.S. Cl.
CPC ........ *H04N 5/23219* (2013.01); *G06K 9/00221* (2013.01); *H04N 5/235* (2013.01); *H04N 5/23222* (2013.01); *G06K 2009/00328* (2013.01)

(58) Field of Classification Search
CPC ................................................ H04N 5/23219
See application file for complete search history.

(56) References Cited

U.S. PATENT DOCUMENTS

| 8,121,404 | B2* | 2/2012 | Xiao et al. | 382/167 |
| 8,311,277 | B2* | 11/2012 | Peleg et al. | 382/103 |
| 8,638,979 | B2* | 1/2014 | Singhal et al. | 382/100 |
| 2005/0264658 | A1* | 12/2005 | Ray et al. | 348/239 |
| 2007/0222553 | A1* | 9/2007 | Lim et al. | 340/3.1 |
| 2007/0242153 | A1* | 10/2007 | Tang et al. | 348/365 |
| 2011/0200273 | A1* | 8/2011 | Singhal et al. | 382/284 |

OTHER PUBLICATIONS

Zhao et al. "Face Recognition: A Literature Survey", ACM Computing Surveys, vol. 35, No. 4, Dec. 2003, pp. 399-458.
Dalal et al., "Human Detection Using Oriented Histograms of Flow and Appearance", A. Leonardis, H. Bischof, and A. Prinz (Eds.): ECCV 2006, Part II, LNCS 3952, pp. 428-441, 2006.

(Continued)

*Primary Examiner* — Gary C Vieaux
(74) *Attorney, Agent, or Firm* — Pearl Cohen Zedek Latzer Baratz LLP

(57) ABSTRACT

A method for capturing important objects with a camera may include the following steps: non-selectively capturing an incoming sequence of images using an image capturing device; analyzing said incoming sequence of images, to yield metrics associated with objects contained within the images, wherein at least one of the metrics is calculated based on two or more images; automatically deciding, in real time, on selectively capturing a new image wherein the selective capturing is carried out differently than the non-selective capturing, whenever the metrics of the objects meet specified criteria; and determining at least one object as an important object, wherein said determining associates the selected object with a level of importance and wherein said metrics are calculated only for the at least one important object.

10 Claims, 10 Drawing Sheets

(56) References Cited

OTHER PUBLICATIONS

Damera-Venkata et al. "Image Quality Assessment Based on a Degradation Model", IEEE Transactions on Image Processing, vol. 9, No. 4, Apr. 2000.

Bhattacharya et al., "A Framework for Photo-Quality Assessment and Enhancement based on Visual Aesthetics", In Proc. of ACM International Conference on Multimedia (MM), Florence, IT, pp. 271-280, 2010.

Joshi et al., "A Survey on Moving Object Detection and Tracking in Video Surveillance System", International Journal of Soft Computing and Engineering (IJSCE), ISSN: 2231-2307, vol. 2, Issue-3, Jul. 2012.

Shotton et al., "TextonBoost: Joint Appearance, Shape and Context Modeling for Multi-Class Object Recognition and Segmentation" in European Conference on Computer Vision (2006), pp. 1-15.

Whitehill et al., "Towards Practical Smile Detection", IEEE Transactions on Pattern Analysis and Machine Intelligence (TPAMI), vol. 31, Issue 11, pp. 2106-2111, Nov. 2009.

Viola et al. "Robust Real-time Object Detection", Second International Workshop on Statistical and Computational Theories of Vision—Modeling, Learning, Computing, and Sampling, Vancouver, Canada, Jul. 13, 2001, pp. 1-25.

* cited by examiner

METHOD AND SYSTEM FOR CAPTURING IMPORTANT OBJECTS USING A CAMERA BASED ON PREDEFINED METRICS

CROSS-REFERENCE TO RELATED APPLICATIONS

This application is a continuation-in-part of U.S. patent application Ser. No. 14/329,377 filed on Jul. 11, 2014 which claimed priority from U.S. Provisional Patent Application No. 61/844,924, filed on Jul. 11, 2013, all of which are incorporated herein by reference in their entirety.

FIELD OF THE INVENTION

The present invention relates generally to computer vision, and more particularly, to employing computer vision techniques in assisting with digital photography.

BACKGROUND OF THE INVENTION

Prior to the background of the invention being set forth, it may be helpful to set forth definitions of certain terms that will be used hereinafter.

The term "object" as used herein is defined as an entity in a photo, or set of photos, that corresponds to a real object in the world, e.g. a specific (not the class) person, pet or even a general thing such as a car. Therefore, a single person that is recognized in multiple photos will be considered as a single object, having several instances.

The term "smart camera" as used herein is defined as a user equipment (e.g., smartphone, tablet PC, laptop, head mounted cameras) that is equipped with image capturing capabilities and is further equipped with hardware or software enabling it to make automatic decisions in real-time based on analysis of the input footage and the camera sensors.

The term "saliency" as used herein is defined as the state or quality by which an object (such as a person) stands out relative to its neighbors in a scene (in space and/or in time) captured by a camera. In psychology, saliency detection is considered to be a key attentional mechanism that facilitates learning and survival by enabling organisms to focus their limited perceptual and cognitive resources on the most pertinent subset of the available sensory data. Saliency typically arises from contrasts between objects and their neighborhood.

Machine assisted image capturing is well known in the art of photography. Many cameras and image capturing applications running on smartphones tend to employ some form of semi-automatic capturing in which the user make the most important decision of the timing of the capturing and the point of view of the capturing and the camera does the rest: exposure time, lighting conditions, resolution, and the like.

It would, therefore, be advantageous to use the computing power of the camera (e.g., of a smartphone) to also assist in making the decision of the capturing time and camera settings.

SUMMARY OF THE INVENTION

Some embodiments of the present invention provide a method for capturing important objects with a camera. The method may include the following steps: capturing an incoming sequence of images using an image capturing device; analyzing said incoming sequence of images, to yield metrics associated with objects contained within the images, wherein at least one of the metrics is calculated based on two or more nonconsecutive images; automatically deciding, in real time, on selectively capturing a new at least one image whenever the metrics of the objects meet specified criteria and wherein the selective capturing is carried out using a setting that is different than the setting used for capturing the incoming sequence of images; and associating at least one object with a level of importance and wherein at least one of the metrics is calculated based on the importance level of the objects.

According to some embodiments of the present invention, the associating of importance level may be carried out responsive to user selection.

According to some embodiments of the present invention, the user selection may be carried out from a subset of objects presented simultaneously to the user at a specified area distinguishable from the incoming sequence of images.

According to some embodiments of the present invention, the method may further include adjusting settings of the capturing device so as to optimize the capturing of objects associated with a level of importance above a predefined level.

According to some embodiments of the present invention, the method may further include presenting a user with a recommendation relating to adjusting the position and/or orientation of the capturing device, based on the metrics of at least one object associated with a level of importance above a predefined level.

According to some embodiments of the present invention, the deciding of the capturing may be carried out automatically whenever a saliency level computed for at least one object associated with a level of importance above a predefined level, exceeds a specified threshold.

According to some embodiments of the present invention, the saliency level may be determined by calculating a probability distribution function of said at least one captured object.

According to some embodiments of the present invention, the deciding of the capturing may be carried out automatically whenever a position within an image frame of at least one object associated with a level of importance above a predefined level fulfills specified criteria.

According to some embodiments of the present invention, the deciding of the capturing may be carried out automatically whenever a motion metric of the capturing device exceeds a predefined value.

According to some embodiments of the present invention, the method may further include storing visual meta data relating to captured objects and using the stored visual meta data in future capturing sessions for calculating the metrics.

According to some embodiments of the present invention, the storing is carried out only for objects associated with a level of importance above a predefined level.

According to some embodiments of the present invention, the stored visual meta data may be associated with an image portion representing a face or a person.

According to some embodiments of the present invention, the difference in the setting relates to the optics of the capturing device.

According to some embodiments of the present invention, the importance level may be calculated based on level of representation of a specific object in the captured sequence till a specific point of time.

According to some embodiments of the present invention, at least one of the metrics may be associated with at least one geometrical feature of at least one of the captured object.

According to some embodiments of the present invention, the capturing device may be set to optimize image quality of an image portion proximal to at least one of the objects associated with a level of importance above a predefined level.

According to some embodiments of the present invention, the method may further include automatically generating an edited video clip based on the selectively captured images.

According to some embodiments of the present invention, at least one of the metrics may be based on video editing criteria.

According to some embodiments of the present invention, the video editing criteria may include at least one of: level of representation of objects associated with a level of importance above a predefined level, mixture of videos and photos, maximizing variety of positions, avoiding non-salient moments, and maximizing representation of object motion.

These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

Figure 1:
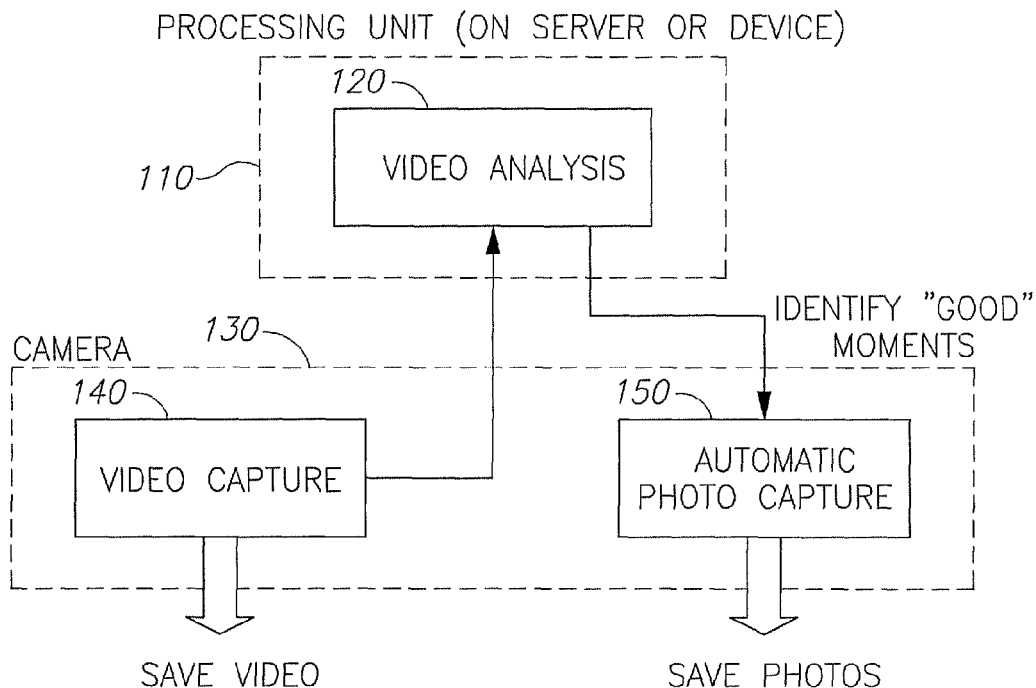
FIG. 1 is a schematic block diagram illustrating a system according to some embodiments of the present invention.

With specific reference now to the drawings in detail, it is stressed that the particulars shown are by way of example and for purposes of illustrative discussion of the preferred embodiments of the present technique only, and are presented in the cause of providing what is believed to be the most useful and readily understood description of the principles and conceptual aspects of the present technique. In this regard, no attempt is made to show structural details of the present technique in more detail than is necessary for a fundamental understanding of the present technique, the description taken with the drawings making apparent to those skilled in the art how the several forms of the invention may be embodied in practice.

Before at least one embodiment of the present technique is explained in detail, it is to be understood that the invention is not limited in its application to the details of construction and the arrangement of the components set forth in the following description or illustrated in the drawings. The present technique is applicable to other embodiments or of being practiced or carried out in various ways. Also, it is to be understood that the phraseology and terminology employed herein is for the purpose of description and should not be regarded as limiting.

FIG. 1 is a block diagram 100 illustrating a first aspect of the system in accordance with some embodiments according to the present invention. Processing unit 110 (being on a device such as a smartphone or on a remote server) is coupled to a camera 130. Camera 130 is configured to obtain video capture 140 in which video may be saved and delivered to processing unit 110 for video analysis 120. Video analysis 120 identified so-called "good" moments and instructs camera 130 to perform automatic photo capture 150 in which specific photos are saved.

Figure 2:
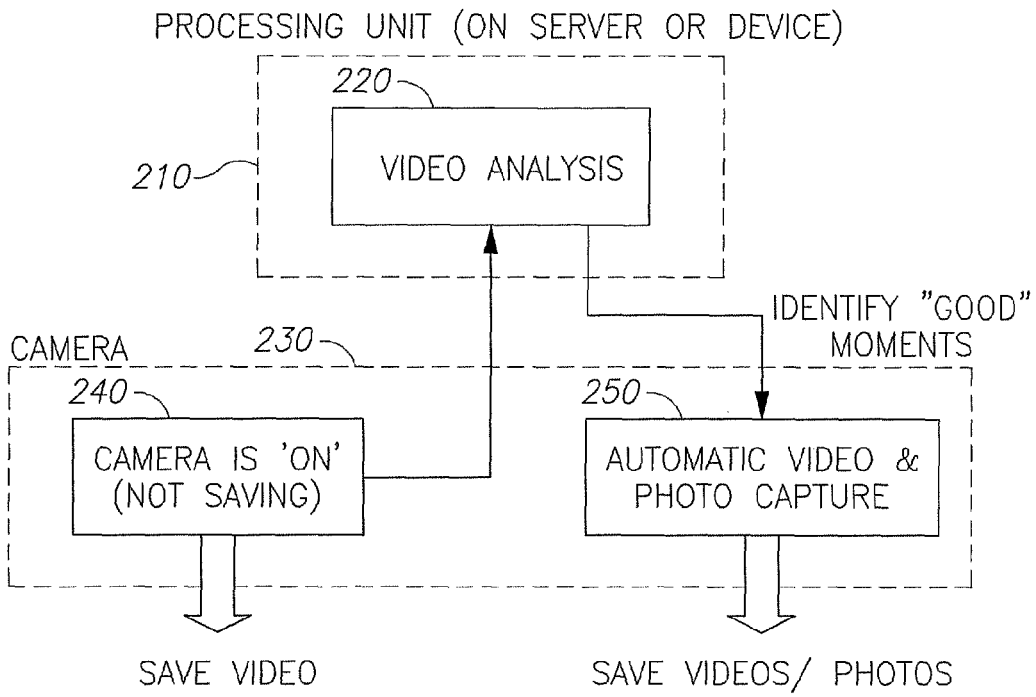
FIG. 2 is a schematic block diagram illustrating a system according to some embodiments of the present invention.

FIG. 2 is a block diagram 200 illustrating a second aspect of the system in accordance with some embodiments according to the present invention. Processing unit 210 (being on a device such as a smartphone or on a remote server) is coupled to a camera 230. Camera 230 is "ON" but not saving 140 video which is delivered to processing unit 210 for video analysis 220. Video analysis 220 identified so-called "good" moments and instructs camera 230 to perform automatic photo capture 250 in which specific photos or video portions are saved.

Some embodiments of the present invention enable a user of a smart camera to benefit from several features as follows:
  Use object-based metrics to automatically decide on camera actions such as automatic photo capture;
  Calculate on importance level for each object, and base decisions upon these importance levels, for example—optimize the camera focus based on the area of the important objects;
  Store important objects to an object pool, and use the objects stored in previous camera sessions to determine the important objects in current camera session; and
  Optionally, base the automatic decisions and metrics on an objective function that aims to optimize the quality of an edited video that will use the captured footage.
  Optionally, the importance of an object can be calculated also based on its appearances in existing photos or videos of the user, for example, photos taken by other camera applications, or even footage that is external to the device, e.g. —photos from Facebook.

Optionally, the importance of an object can be effected by actions made by external cameras, for example—the number of cameras that are taking photos of this objects in a given event. According to some embodiments of the present invention, in order to make better automatic decisions, the system may automatically learn the user preferences using the history of the user actions and his captured footage (This automatic learning can be combined with manual user preferences).

By way of illustration, detailed below are non-limiting examples for user preference that may be learned:

The preferences of the user regarding taking photos or videos. This can be learned from the percentage of photos vs. videos taken manually by the user.

The user preferences regarding automatic photo (/video) capturing—learning its preferred rate of automatic photo capture. This can be learned from the amount of photos he takes manually, the percentage of automatic photos being deleted, etc'.

The preferences of the user regarding camera settings—focus, exposure, etc.

The preferences of the user regarding the content of the footage: e.g., whether he favors scenery photos vs. photos of people, classical compositions vs. artistic ones, etc.

The preference of the user regarding specific objects, e.g., family members, good friends, personal pets, and a like, tend to appear more frequency in the user's footage than other people or objects.

The user may give a rating to automatically capture photos, to indicate its satisfaction from the captured photos.

These preferences can be used by the system to enhance its importance level computation and the decision regarding actions to be taken. For example, if the user likes scenery shots, it may reduce the importance level given to people close-ups. Another example is the rate of automatic photos being taken, which can be adjusted to the user preferences automatically, for example, reducing the rate of the automatically taken photos is the user give these photos a low rate, or prefer to delete then rather than to save them.

There are various known ways to extract objects from photos and videos. Described herein are several such methods that can be used for this task.

There are various classes of objects, whose detection is broadly discussed in the literature. For example, detection of faces is a well-known problem in computer vision, and there exist a large number of methods that addresses this problem, such as the method discussed at Paul Viola and Michael Jones, Robust Real-time Object Detection, IJCV 2001, which is incorporated herein by reference in its entirety. Other examples are person detection as in Navneet Dalal, Bill Triggs and Cordelia Schmid, Human detection using oriented histograms of flow and appearance, ECCV 2006, pp. 428-441, which is incorporated herein by reference in its entirety.

A detection scheme for general pre-defined object classes is presented in "TextonBoost, Joint Appearance, Shape and Context Modeling for Multi-Class Object Recognition and Segmentation", Jamie Shotton, John Winn, Carsten Rother and Antonio Criminisi, in European Conference on Computer Vision (2006), pp. 1-15, which is incorporated herein by reference in its entirety.

Optionally, an object can be manually indicated by the user, e.g., by tapping on the camera's screen, where an instance of this object appears.

When the analyzed footage is a video or a sequence of images, there is more information that can also be used for object detection. For example, one of the most popular methods is detection of moving objects based on background subtraction. A survey of various methods for motion-based extraction of objects and their tracking is shown in "A Survey on Moving Object Detection and Tracking in Video Surveillance System", Kinjal A Joshi, Darshak G. Thakore, International Journal of Soft Computing and Engineering (IJSCE), pages 2231-2307, Volume 2, Issue 3, July 2012, which is incorporated herein by reference in its entirety.

In order for information regarding an object from multiple frames to be extracted, it is important to be able to track an object over time. As long as the object appears in the field of view of the camera, or even if it disappears for a short time, there are many traditional object tracking algorithms that are able to identify its existence and calculate its position over multiple frames.

In other cases, for example, if the object appears in two images that are taken at totally different times, under different capturing conditions (e.g., video vs. photo) or under different lighting conditions, object recognition can be used to identify that two images contain the same object. This can be done using various object recognition and indexing techniques, for example, using the method described in W. Zhao, R. Chellappa, A. Rosenfeld and P. J. Phillips, Face Recognition: A Literature Survey, ACM Computing Surveys, 2003, pp. 399-458, which is incorporated herein by reference in its entirety for the case of faces ("Face Recognition"), or using the method described for general objects in US Patent Application Publication No. 2011/0218997, which is incorporated herein by reference in its entirety.

The objects that were detected are tracked or recognized over time, as described above. In each frame, we can define the importance of an object based on its current and previous instances.

One way to define an object as important (or to raise its importance level) is via a user selection UI, in which the user can associate an object with a level of importance or simply mark it as "important" or "non important" (i.e., a binary importance level).

Figure 4:
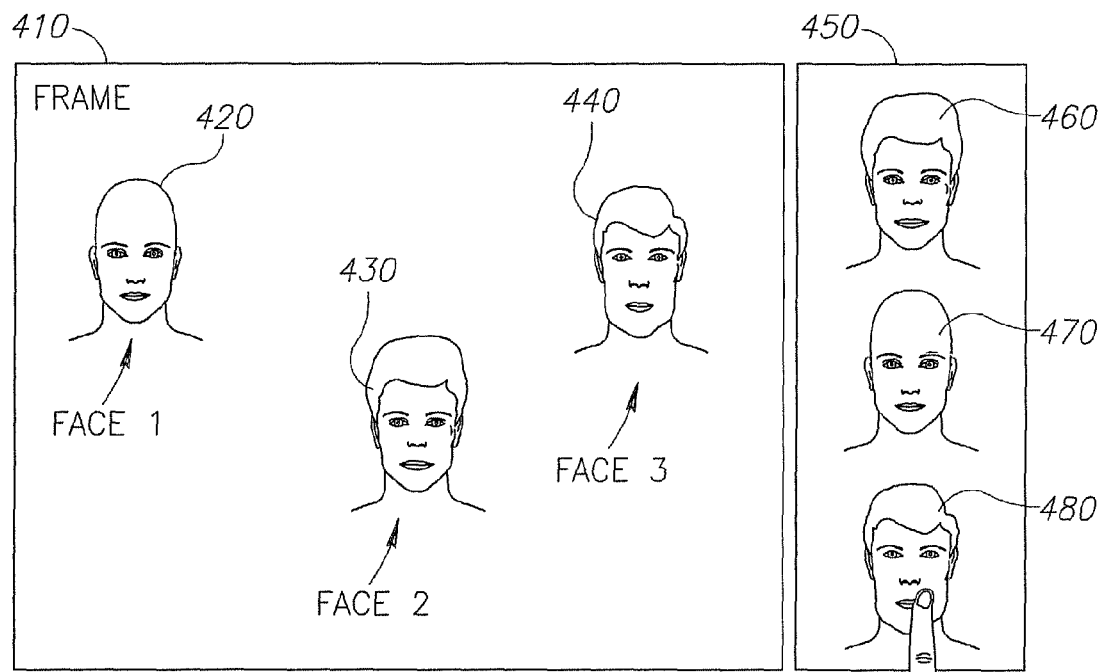
FIG. 4 is a diagram illustrating an aspect of the system in accordance with some embodiments according to the present invention.
Figure 5:
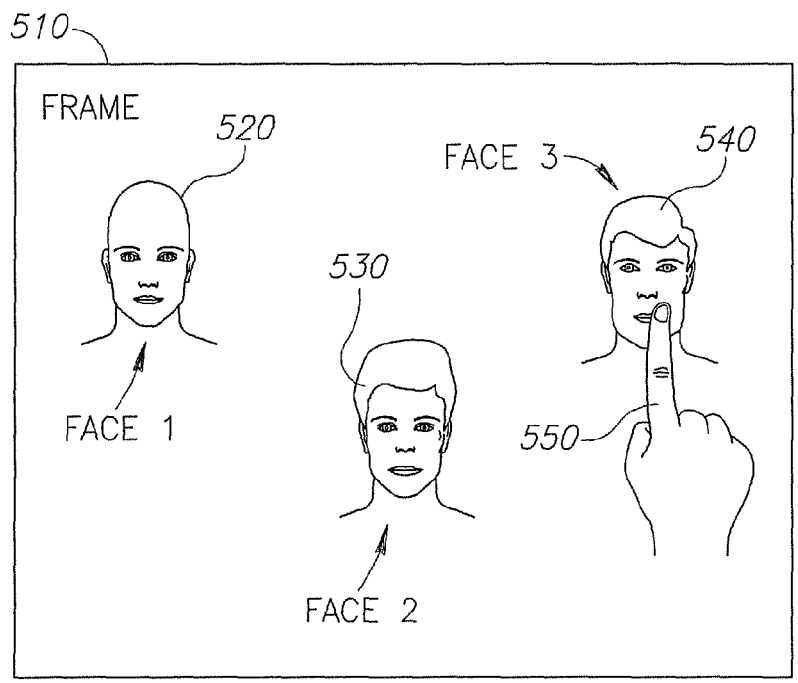
FIG. 5 is a diagram illustrating an aspect of the system in accordance with some embodiments according to the present invention.

FIGS. 5 and 4 are diagrams illustrating an example for such UI. Following is described an automatic way to determine the importance level of an object.

The importance of an object can be determined automatically from its set of detected instances in the past. For example, a simple importance measure is the frequency of the appearance of this object:

$$\mathrm{Imp}(Obj)=F(\#Obj)$$

where #Obj is the number of images in which the object Obj appears, and F is some function, e.g.—the robust function $F(x)=\mathrm{Sqrt}(x)$.

Other components for calculating the importance level of an object are:

Whether this object appeared in previous images (i.e., before the last time camera was opened). This can be checked by comparing the current object instance with the objects saved in an object pool, as described later.

The size of the object relative to the size of the frame (If the face is shown in close-up, it received high importance level).

The relative camera-object positioning. E.g., if the object in the center of the image, or if the camera zooms to this object, it may indicate that this object is important.

The characteristics of the camera, the scene and the objects that were detected are analyzed during the photo capturing to yield various metrics to be used to make "smart decisions". Such decisions can be to automatically take a picture, to set the camera parameters or to direct the user in capturing additional footage.

Some of the metrics are general in the sense that they are not associated with any object.

Following is a non-exhaustive list of metrics that may be indicative of an importance level of specific objects:

Image quality metric—For each input image, we define a metric of its quality measure. For example, blurry, dark or noisy images (See for example Image Quality Assessment Based on a Degradation Model, Niranjan Damera-Venkata, Thomas D. Kite, Wilson S. Geisler, Brian L. Evans, and Alan C. Bovik, IEEE Transactions of Image Processing, Vol. 9, No. 4, April 2000, which is incorporated by reference herein in its entirety) will get a lower value, while sharp, colorful and low-noise images will get high value for this metric. More sophisticated methods for estimating the quality of an image exist, some of them even make a usage of the objects detected in the image (See for example "A framework for photo-quality assessment and enhancement based on visual aesthetics", Subhabrata Bhattacharya, Rahul Sukthankar, Mubarak Sha, In Proc. of ACM International Conference on Multimedia (MM), Florence, IT, pp. 271-280, 2010, which does object-based image quality evaluation and is incorporated by reference herein in its entirety).

Motion metric: The motion of the camera can be used as a strong cue for the user's intention to taking a photo. For example, if the camera is undergoing a large movement (or rotation) or is looking towards the floor or the sky, and then at some moment the camera is held stable and horizontally, it increases the probability that the user intends to take a photo. The motion of the camera can be inferred from the camera's motion and position sensors. It can also be estimated using various well known methods (e.g., using the open-source computer vision library 'openCV').

Interaction between multiple objects. The interaction may be one of activity that interrelates one object or another in the real world, some can be deduce by a tempo-spatial analysis and some may require further image processing to derive nature of activity and interrelation. Some non-limiting examples may include: objects 'talk to each other', objects 'look at each other', 'object 1 plays with object 2', or even 'appears in adjacency to each other'. It should be noted that interaction of multiple objects may influence the importance of both objects (e.g.—an object that interact with another important object may get a higher importance level as well). In addition, the interaction of objects may influence the editing and shooting rules, by taking into account the relation between the objects. For example—adding a prior for placing these objects in consecutive selections, in order to improve the continuity of the editing and the story telling.

For simplicity, the objects that are demonstrated herein are persons, but similar metrics can be applied to more general objects, such as pets.

Given an object Obj, a set of metrics corresponding to this object is defined, measuring various aspects or characteristics of this object over time—such as its position, state, action, and the like.

Action metrics: measuring the amount of activity of the object over time. Moments with high activity may be good candidates for automatically taking a picture (or video/photo burst). There are various activity measures in the literature. A simple example for such activity measure for an object is using the following scheme:

Assume that two instances of the object Obj are given, $Obj_{t1}$, $Obj_{t2}$ (in times t1 and t2). A simple activity measure will be:

Warp the image $Obj_{t2}$ towards $Obj_{t2}$ according to their relative motion (can be translation only, based on the tracking of the object or based on their bounding boxes, or use more a complicated motion computation).

Compute the differences between the two instances, e.g.—SSD over the intersection window: $Diff(Obj_{t1}, Obj_{t2}) = \Sigma_p (Obj_{t1}(p) - Obj_{t2}(p))^2$ Use this difference as an activity metric (higher difference means higher activity).

Alternatively, the activity measure can be based on a general saliency measure. It should be noted, that this measure is usually computed over several frames, e.g., by taking the average activity rate over a small time period.

Facial expressions Metrics: There are metrics that are special for objects that are people. These metrics measures the "aesthetic" of an image based on the facial expression of the person. A simple example is giving a high score for the moments in which the person is smiling (which is a good moment for taking a picture). Various methods for facial expressions analysis exist in the literature, such as the method presented in: Toward Practical Smile Detection, Whitehill, J., Littlewort, Gwen, Fasel, Ian, Bartlett, M. and Movellan, J. Volume 31, Issue 11, 2106-2111, 2009, which is incorporated herein by reference in its entirety.

Object position and orientation metrics: The instantaneous position and orientation of the object in the frame can be used as a metric. For example, one can measure the distance of the object from the center of the image:

$$M(obj, t) = e^{-\frac{\|C_{obj}(t) - C_{frame}\|}{\sqrt{H^2 + W^2}} a}$$

where Cobj(t) and Cframe are the center of the object's bounding box (at time t), and the center of the frame respectively, H,W are the height and width of the frame, and a is a constant.

Another metric is based on the orientation of the object (for object classes for which the orientation is relevant)—measuring weather the object is facing the camera. For example, for faces, there are various known methods (e.g., as in Paul Viola and Michael Jones, Robust Real-time Object Detection, IJCV 2001) to determine whether the face is a frontal face or a profile, or even to measure its 3D angle. This measure can also be used as a "Object position and orientation" metric.

In many cases, the interesting information will be a change in a metric, or the change of some behavior over time. Therefore, for each metric "differential" metric, can be defined measuring the change in the metric over time. For example, considering the orientation of a person relative to the camera (see "Object position and orientation" metrics), a metric measuring the amount (and direction) of the change in the orientation can be defined, and give high score for this metric, for example, if a person changes its orientation from being profile to more frontal.

The above metrics can be combined together to form more complex metrics, that can be inferred as more general "object esthetics" measures. For example, a unified object-quality metric can be defined as a linear combination of object-based metrics:

$$M(obj,t) = \Sigma \alpha_i M_i(obj,t)$$

where $M_i(obj,t)$ are different object-based metrics calculated for object Obj at time t, and $\alpha_i$ are combination weights.

As for the object-based metrics, various object-based and general metrics can be combined to form complex metrics. For example, by using a weighted average of several metrics. For example, we can say that a person has a good instance (measured by high "quality" metric) if he is looking forward, smiling (both object-based metrics), and the camera is relatively stable (non-object metric).

The metrics that are calculated as described in the previous section are used to trigger camera actions. The simplest mechanism for triggering an action is simply by checking if one of the metrics passed a pre-defined threshold:

$$\text{Trigger}(t)=\text{any}\{M_i(t)>\epsilon_i\}$$

where Mi is the set of all metrics, computed over all objects (including general metrics), and $\epsilon_i$ are some pre-defined thresholds. Alternatively, the trigger can be based on a combination of several conditions, e.g.:

$$\text{Trigger}(t)=\text{all}\{M_i(t)>\epsilon_i\}$$

where $M_i$ is a subset of the metrics. For example—take a photo if the activity of a person is larger than a given threshold ("Action" metric), and in the same time this person is smiling ("Facial expressions" metric).

It should be noted, that the action triggers can be based also on the history, e.g., waiting that a metrics exceeds a certain threshold over a given period of time. This fact can be encapsulated in the metrics themselves by defining complex metrics that integrate other metrics over time.

A variation of the above trigger mechanisms is by settings the triggers only for those metrics that are associated with important objects, wherein the importance level of each object is described hereinafter. For example, by defining a trigger of the form:

$$\text{Trigger}(t)=\text{any}\{M_i^k(t)>\epsilon_i\}_{i,k} \text{ over } ks\cdot\text{Importance}(\text{Obj}_k)>\beta$$

where $M_i^k$ is the i-th metric, computed over object k. In other words, the trigger is activated only if the respective metric corresponds to an object whose importance exceeds importance level $\beta$ (A pre-defined threshold).

The previous sections described a mechanism of action triggers based on calculated metrics. These action triggers result in some camera actions that are described in this section. Obviously, the actual action depends on the respective metrics and triggers. Examples for camera actions are automatic photo capture (described hereinafter) or automatic adjustment of capture quality (e.g., reducing quality at non-important moments to save storage or battery life).

Automatic photo capture is the action of automatically taking a photo or a video based on the analysis of the input footage and the camera sensors. Variations of photo capture can also be used, such as photo-burst, panoramic image, HDR image, etc.

In case of taking a video, this might be done by simply deciding to save the input stream of images (instead of initiate an actual camera action such as taking a new photo).

The decision if the specific action, such as taking a photo or a video, can be determined based on the relevant metrics. For example, taking video if the trigger involves an action metric, or taking photo otherwise.

The action been taken can be influenced by the previous actions, e.g., avoiding taking multiple photos in a short time period, or avoiding taking multiple photos due to the same metric, in a short time period.

The automatic photo capture can be done in conjunction with automatic camera setting, as described below.

Automatic camera setting is an action in which the camera settings are adjusted based on the input image analysis and the camera sensors. It can be done in conjunction with the automatic photo capture (as a preparation for taking a photo) or it can be done independently.

Examples for common camera settings that can be controlled automatically are Focus, Flash, Color correction, Exposure, Zoom, AGC (automatic gain control), Shutter Speed, Frontal/Rear cameras, and more.

In all cases, the setting is changed to optimize the quality of the image at the important regions. These regions are identified as important based on the importance level of object instances that were detected in these regions.

Having determined the important regions, the camera setting is changed to optimize the image quality at these important regions. For example, setting the focus and the optimal exposure on the most important person, or zooming on this person. The system might also continuously adjust the camera settings to improve the smoothness of the footage: for example, setting the automatic gain control (AGC) such that an important moving object will appear in a constant (or smooth) exposure (unlike the common AGC which controls the exposure based on the entire scene).

Figure 3:
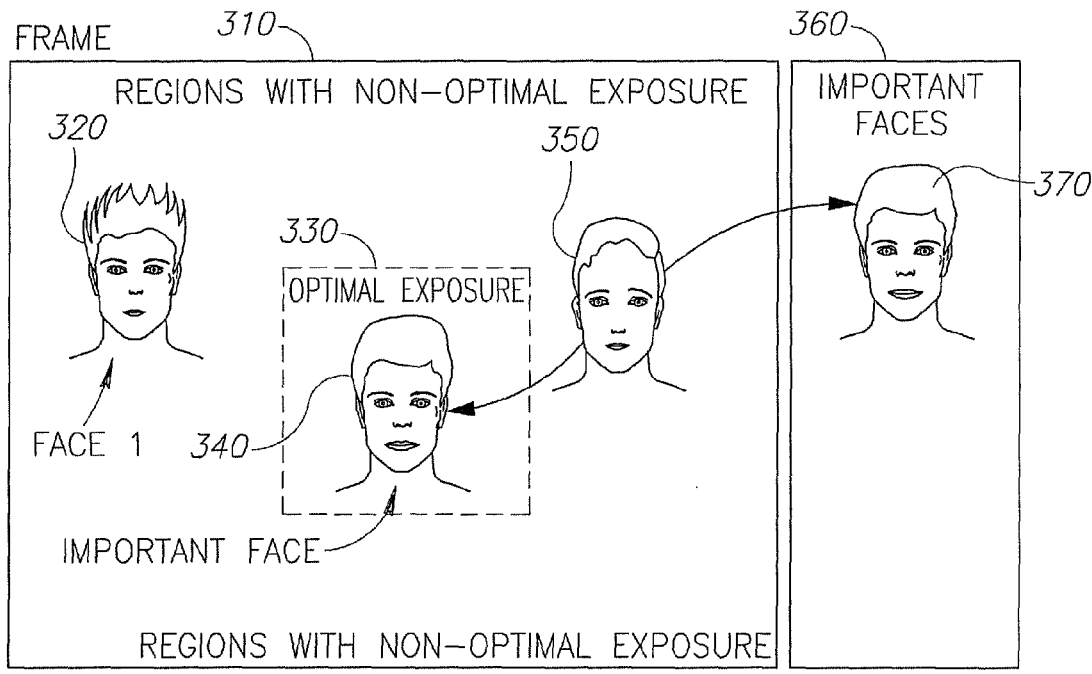
FIG. 3 is a diagram illustrating an aspect of the system in accordance with some embodiments according to the present invention.

FIG. 3 is a diagram 300 illustrating an aspect in accordance with embodiments of the present invention. Optimal camera setting (e.g., exposure) is set according to the important entity in the frame 310, even though other faces 320 and 350 were detected (but not identified as important, or identified as less important. The optimal exposure is set based on a region 330 containing the important face 340. The face can be indicated as important, for example, over a UI in a designated are 360 exhibiting the important face 370 as such.

FIG. 4 is a diagram illustrating an aspect of the system in accordance with embodiments according to the present invention. Frame 410 displays three faces: 420, 430, and 440. All faces are also presented in a UI portion 450 as thumbnails 460, 470, and 480. Selecting one or more of thumbnails 460, 470, and 480 by touching them with a FIG. 490 indicates the selected face (face 3) as an important object.

FIG. 5 is a diagram 500 illustrating an aspect of the system in accordance with embodiments according to the present invention. Frame 510 displays three faces: 520, 530, and 540. Selecting one or more of them by touching them with a FIG. 550 indicates the selected face (face 3) as an important object.

Figure 6:
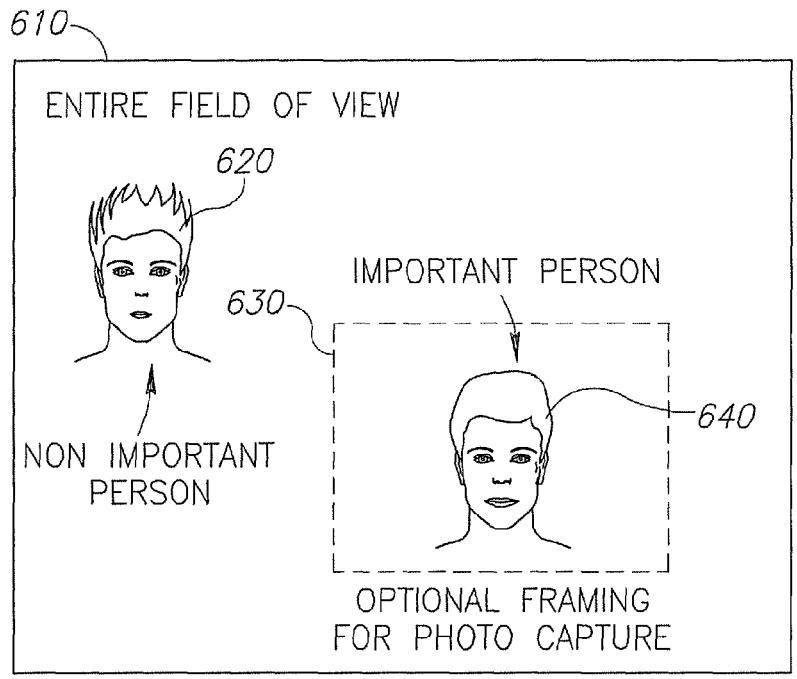
FIG. 6 is a diagram illustrating an aspect of the system in accordance with some embodiments according to the present invention.

FIG. 6 is a diagram 600 illustrating an aspect in accordance with embodiments of the present invention. For frame 610 Automatic zoom is being implemented based on important objects. When deciding to take a photo, the camera can automatically zoom-in to optimize the quality of the photo taken, for example, by zooming on an important person or object 640 so that entire field of view of frame 610 is being reduced to zoomed in frame 630 containing important object 640 and leaving out non-important object 620.

To automatically determine the best camera settings, the information of the important regions can be combined with the contemporary information, for example, the camera sensors information, such as the measure of exposure at the current frame. Obviously, the user may affect or override automatic decisions according to his preferences.

Some of the meta-data, such as the object tracks or the important objects (or their importance level) can be displayed to the user. This information can be displayed on top of the regular camera view (overlaid) or it can be shown in a special pane. For example, shows an example in which important faces are emphasized in a special pane.

Figure 7:
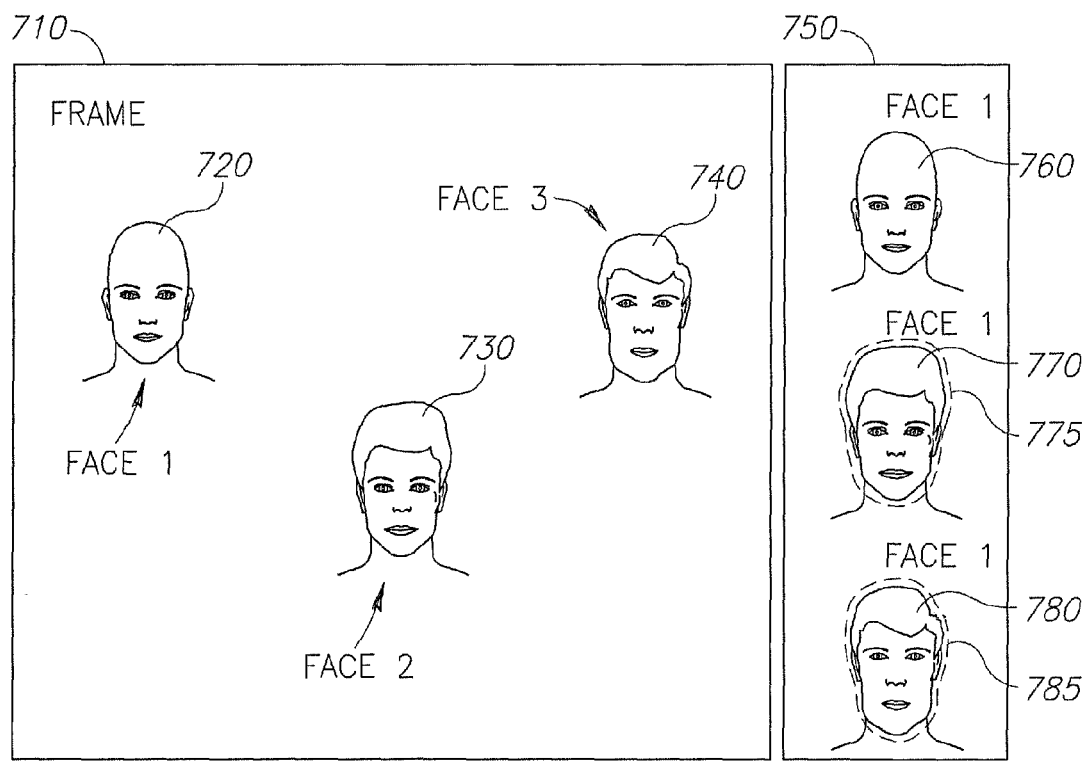
FIG. 7 is a diagram illustrating an aspect of the system in accordance with some embodiments according to the present invention.

FIG. 7 is a diagram 700 illustrating an aspect in accordance with embodiments of the present invention. Displaying metadata to the user is being implemented herein. While frame 710 displays three faces 720, 730, and 740 a dedicated UI portion 750 displays the thumbnails of the detected faces 760 (face 1), 770 (face 2) and 780 (face 3) to the user. Additionally, the ones that exceed a certain level of importance are emphasized by a specified indicator 775 and 785 (faces 2 and 3).

Figure 8:
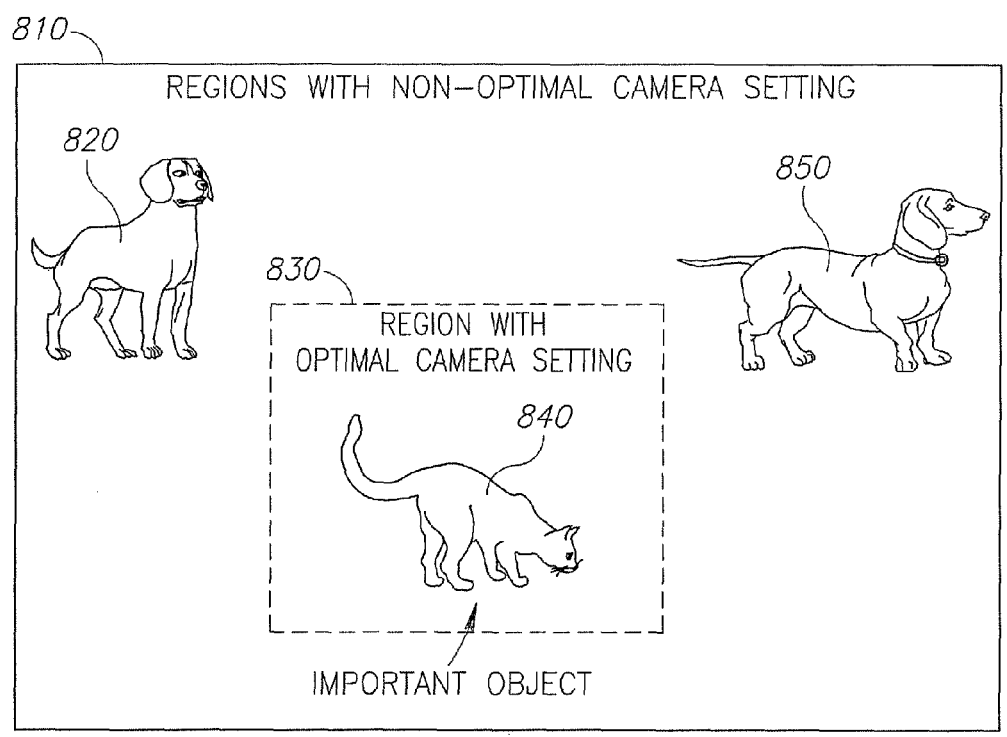
FIG. 8 is a diagram illustrating an aspect in accordance with some embodiments according to the present invention.

FIG. 8 is a diagram 800 illustrating an aspect in accordance with some embodiments of the present invention. Frame 810 contains three objects (e.g., pets) 820, 840 and 850. Object 840 is recognized by the system as an important object. In accordance with embodiments of the invention, the camera setting for region 830 which contains important object 840 is being optimized while for the residual portion of frame 810 which does not contain important objects the camera settings are not being optimized.

In accordance with other embodiments of the present invention, based on the image analysis and camera sensors, various warnings can be displayed to the user, optionally with recommendation of how to improve the capture, for example, by moving the camera.

Example for such warnings may include:
Bad lighting—indicating that the lighting of the scene if not good. The user may change its position to improve the lighting conditions.
Non-stable camera: The camera is too shaky (if it exceeds a certain threshold of camera-shakiness measure).
An important object exits the frame: If an important object is about to exit the frame (due to the camera motion, or if it is moving) the user may get a warning on this event, optionally with a recommendation to move the camera accordingly (i.e., so as the object being inserted to the field of view).
Important object is shadowed/in bad lighting: indicating that the lighting at a specific region of an important object is bad. Obviously, in some cases the camera settings can be automatically been adjusted to improve the quality of the image at the important regions, but in some cases, camera settings are not enough, and the user may be warned or he may be recommended to change the position of the camera to fix the problem.

Besides recommendations that are associated with warnings, the user may receive additional recommendations that will help him improve the input footage. Examples for such recommendations are:
Change the position or orientation of the camera in order to improve the positioning of objects (or important objects) within the frame, e.g., move the camera such as an important object will reside in the center of the frame as demonstrated in FIG. 8 described above.
Change the camera settings, for example—zoom in or zoom out to best capture this object (For example, zoom-in to get a close-up of an object, or zoom-out to get a long shot of the object with the background, etc.).
Create a panorama: Assume that the system detects a user intention to create a panorama of the scene (this intention can be detected easily using camera motion analysis—detecting that the camera is panning)—in this case the system may advise the user to continue taking a panorama by panning the camera smoothly in a constant direction.
Recommendation to take more footage of a given object (E.g. get more footage in which this objects appears in a different scene, or in a different position, action, etc.). This recommendation is used to enrich the footage.

The user can optionally give his or her own preferences during the capture. Examples for such preferences can be
Marking good/significant moments ("like"): such button can affect the metrics by increasing the weight of the marked moments (and may also initiate an action of taking a photo or a video). It can also affect a video editing applied on footage by passing this meta-data to the editing.
Marking bad/boring moments ("dislike"): reducing the weight of the marked moment (and reducing the probability of automatically taking a photo).
Marking important objects such as people in the video, or setting their importance level.

In addition, the user can add general meta-data and preferences. For example:
A shooting mode (panorama, long shot, close up).
The type of scene or video (singing or dancing, party, travel, etc.).
Notifying the user's mood (sad, happy, sleepy, etc.)

It is very common that objects tend to appear across multiple camera sessions, even if these sessions are far-away in time. For example, family members tend to appear in many un-related videos. Between camera sessions that are close in time, there is even a higher chance to have mutual objects. To take advantage of this fact, we suggest storing visual meta-data that is needed to recognize these objects in future camera sessions.

The images captured by the camera are analyzed and objects are being extracted as described above. The visual meta-data relevant to the description of this object is also being calculated, for example—image descriptors calculated inside the support of this object instance (e.g., SIFT descriptors) or the relevant image patch itself (e.g., the image patch inside the object's bonding box). Additional meta-data can also be extracted, such as the bounding box, the object's orientation, facial expressions, action, etc.

In addition, the importance level of each object is estimated based on the instances of the object in the current camera session as described above.

The extracted objects are compared against existing objects that are stored in the 'Object Pool' between multiple sessions. If a stored object is recognized in the object pool, its importance level is being updated in accordance. Various importance updating schemes may be used, but the basic principles for this update will usually be:

If an object appears in the objects pool, it increases its importance level. If an object had high importance level in the objects pool, he will also be important in the current updated object list (assuming he is recognized again in the current session).

A simple example for such a scheme will be:

$$Imp(Obj^{updated}) = \begin{cases} \max(Imp(Obj^{extracted}), Imp(Obj^{pool})) + \gamma & \text{if } obj \text{ found in the pool} \\ Imp(Obj^{extracted}) & \text{if } obj \text{ was not found in the pool} \end{cases}$$

where $\text{Imp}(\text{Obj}^{updated})$, $\text{Imp}(\text{Obj}^{extracted})$, and $\text{Imp}(\text{Obj}^{pool})$ are the importance levels of the object in the updated list (using both current session and the pool), the extracted list (based on the current session only) and the object-pool respectively. $\gamma$ is some constant.

Figure 9:
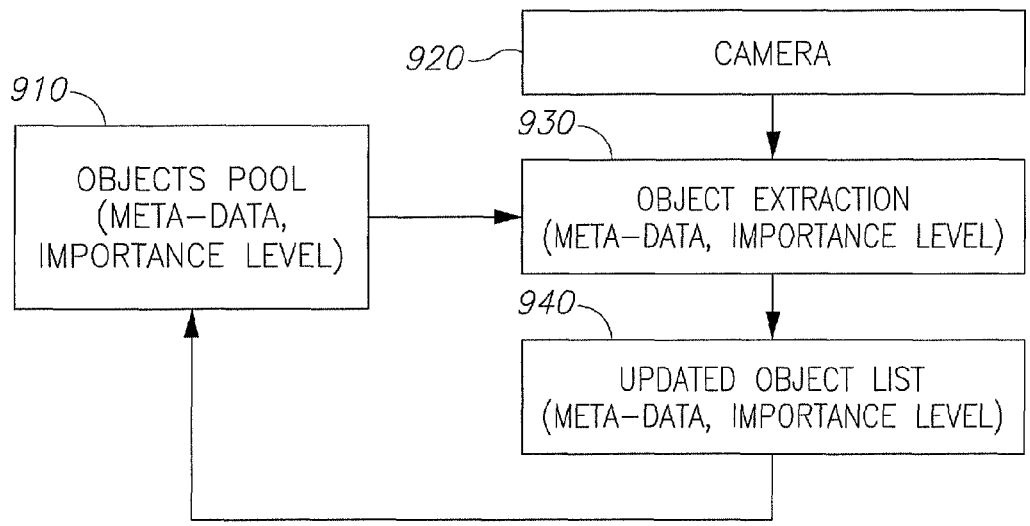
FIG. 9 is a high level block diagram illustrating an aspect in accordance with some embodiments according to the present invention.

FIG. 9 is a diagram 900 illustrating an aspect in accordance with embodiments of the present invention. A schematic diagram for storing and using object's meta-data is shown. Camera 920 provides video from which objects are extracted and analyzed to yield meta data and importance level 930. An object list is then updated (for meta data and importance level) 940 and may be stored on an object pool 910. A variant of the above scheme, which may be used to save running time and storage, is to store only objects whose importance level exceeds a certain threshold.

In a similar way, only extracted objects with importance levels that are above a second threshold may be searched in the objects pool.

A specific case of the scheme described above is storing the face thumbnails of important persons (or a representation thereof), and trying to recognize these faces in the current camera session, followed by marking the persons whose face was found in the object pool as important persons. However, different schemes and other types of objects can also be addressed.

A common approach for optimization of camera settings is taking the best possible picture. However, an editing-orientation capturing, takes into account additional considerations, which aims to produce the best edited video out of the captured event. In particular, it adds considerations such as: catching the important objects in multiple positions and orientation, shooting enough footage of the important objects and scenes, avoiding boring moments, best representing the activity during the event, and the like.

In other words, the criteria for the automatic capture and user recommendations may be based on optimizing the quality of the edited video. Formally, we define an editing-quality-measure, which gives a score to a set of captured assets in an event (including videos and photos). This measure tries to predict the quality of a movie that will be resulted from editing the footage of this event.

A example for such a quality measure may be a weighted average of the following measures:
1. level of representation (#photos*c+sum(video–durtion), where c is a weighting constant) of each object, further weighted by its importance level.
2. Mixture of videos and photos (encouraging events that have both). E.g.: (#photos>0)*$d_1$+(#videos>0)*$d_2$, where $d_1$, $d_2$ are weights.
3. Maximizing the variety of positions and framings of the important objects, e.g.:
   a. $\Sigma_{obj}$[(#long shot(obj)>0)*$e_1$+(#medium shot(obj)>0)*$e_2$+(#close up(obj)>0)*$e_3$)]*imp(obj), where #long shot(obj) is the number of object instances in which the object appears in long-shot framing (and a similar definition for other framings options), $e_1$, $e_2$, $e_3$ are constant weights, and imp(obj) is the importance level of each object.
4. Avoiding boring moments.
5. Representing the activity during the event—capturing at least a small portion of each important activity.

Additional criteria for defining a quality score for editing is described herein.

Maximizing the 'editing-quality-measure' can lead the camera actions by adjusting the metrics respectively. For example—giving a prior for selecting a certain object if taking a new photo of this object will significantly increase the final ' editing-quality-measure'. As a result, the metric for selecting an object may be small, even if the specific photo at a certain moment will be very high, but the captured photo will too similar to previous photos in the event.

Figure 10:
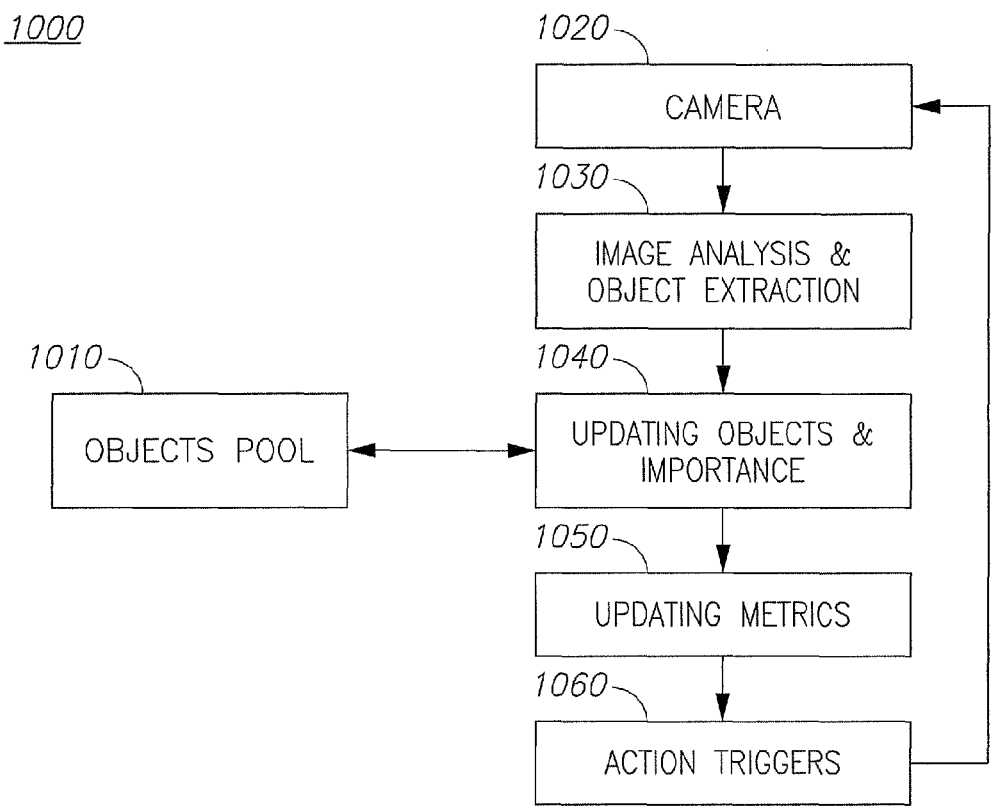
FIG. 10 is a high level block diagram illustrating the flow of the smart camera in accordance with some embodiments according to the present invention.

FIG. 10 is a diagram 1000 illustrating a possible flow for implementing the aforementioned features. The input images from the camera 1020 are analyzed, and objects are extracted 1030. For each object, an importance level is calculated 1040, based on the meta-data extracted for this object over time in the current camera session, and based on possible recognition of this object in an object pool 1010 (which stores important objects from historical camera sessions). Metrics are than computed based on the objects and based on other meta-data extracted from the input images and from the camera sensors 1050. Finally, these metrics are used to initiate camera actions such as automatic photo capture and changing camera settings 1060.

Figure 11:
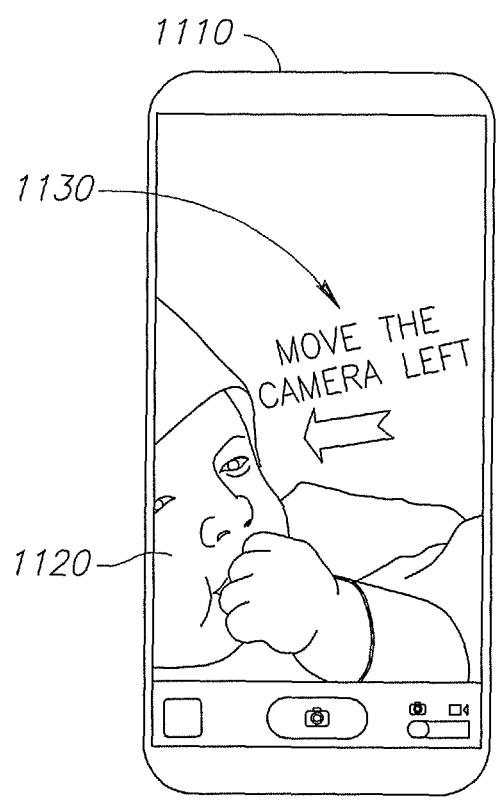
FIG. 11 is a diagram illustrating an aspect in accordance with some embodiments according to the present invention.

FIG. 11 is a diagram illustrating an aspect, in accordance with some embodiments of the present invention. Smartphone 1110 presents on its display the current viewpoint of the camera. An object 1120 is recognized by the system as such and since object 1120 is not centered and some of it is not within the frame, a recommendation 1130 is displayed, encouraging the user to "move the camera left". Other recommendations such as changing the zoom level or position of the camera may also be presented to the user.

Figure 12:
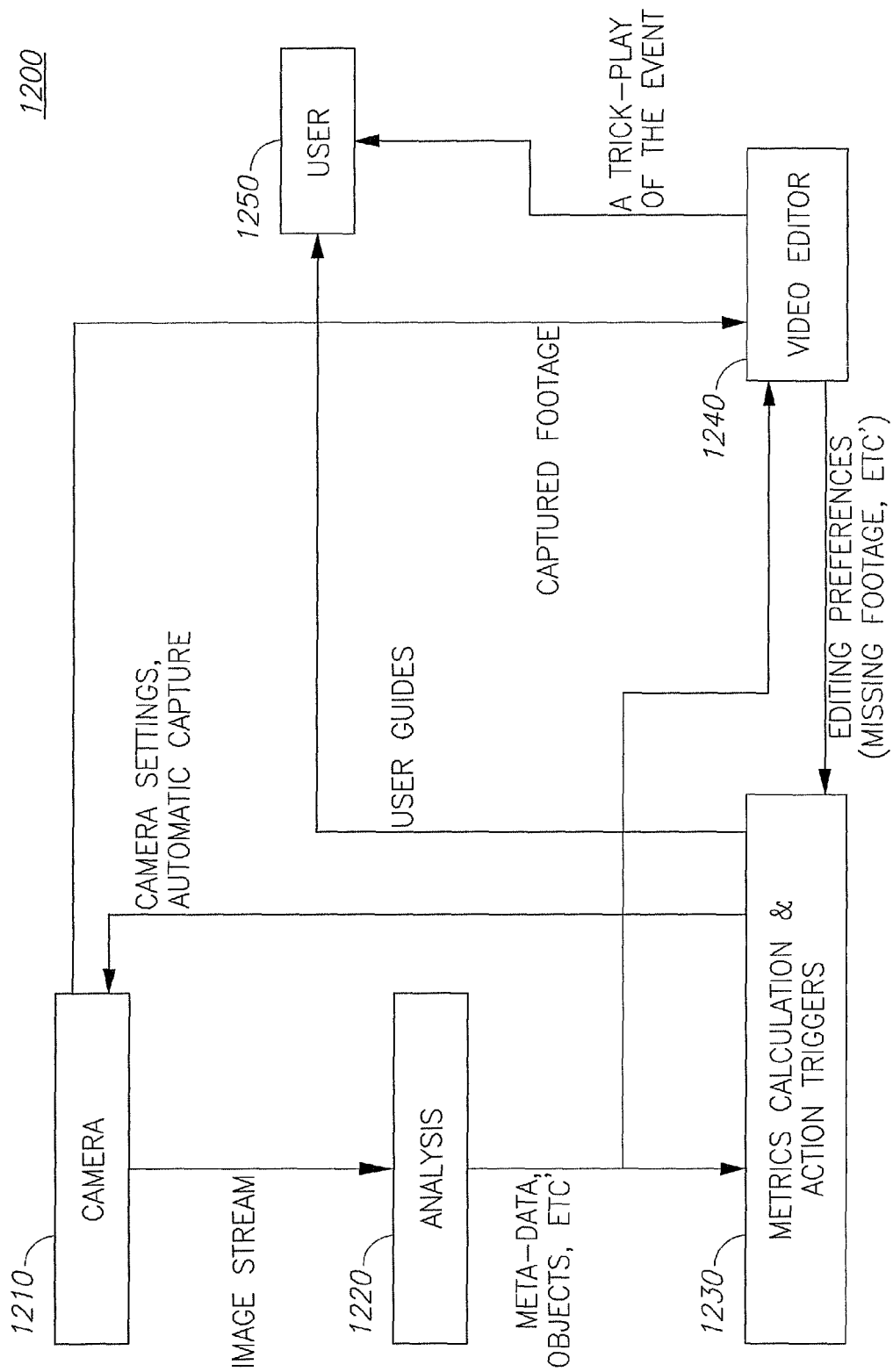
FIG. 12 is a high level flowchart illustrating an aspect in accordance with some embodiments according to the present invention.

FIG. 12 is a diagram 1200 illustrating an aspect in accordance with embodiments of the present invention. The concept of editing oriented capturing is described herein. The video editor 1240 receives the input frames from camera 1210 and the meta-data from after the analysis 1220, and can influence the metrics calculation and the camera action decisions (action triggers) 1230 in order to optimize the quality of the video editing presented to user 1250. Optionally, an edited trick-play is produced from the captured footage, and suggested to the user 1250.

It should be noted, that the meta-data extracted during the capture, including object related meta-data (such as facial expressions, object orientation, etc.) and general meta-data (e.g., sensors data) can be passed to the video editor for improving the editing. In addition, the extracted meta-data can be used to improve the decision on the set of assets that will be defined as an event, and that will be combined together into an edited video (a "trick-play"). A naive way to define an event is simply all the footage taken during a single camera session, or multiple sessions that are close in time and space, but object based criteria may also be define, e.g., combining assets that has mutual objects. In addition, an event may be defined as a partial camera session if the session is large enough and it has enough footage for editing (based on the number of images and videos and the duration of the videos).

Another criteria that can influence the importance of objects is based on interaction between multiple objects. This interaction may be one of: 'talk to each other', 'look at each other', 'object 1 plays with object 2', or even 'appears in adjacency to each other'.

The interaction of multiple objects may influence the importance of both objects (e.g., an object that interacts with another important object may get a higher importance level as well). In addition, the interaction of objects may influence the editing and shooting rules, by taking into account the relation between the objects. For example—adding a prior for placing these objects in consecutive selections, in order to improve the continuity of the editing and the story telling.

Learning User Preferences

For making better automatic decisions, the system can automatically learn the user preferences using the history of the user actions and his captured footage (This automatic learning can be combined with manual user preferences).

Examples for user preference that can be learned are:

The preferences of the user regarding taking photos or videos—This can be learned from the percentage of photos vs. videos taken manually by the user.

The user preferences regarding automatic photo (/video) capturing—learning its preferred rate of automatic photo capture. This can be learned from the amount of photos he takes manually, the percentage of automatic photos being deleted, etc'.

The preferences of the user regarding camera settings—focus, exposure, etc'.

The preferences of the user regarding the content of the footage: e.g., whether he favors scenery photos vs. photos of people, classical compositions vs. artistic ones, and the like.

Additionally, specific objects that are detected in the user's footage may be used to assign higher importance levels to objects—objects that appeared (or appeared frequently) in the user's footage, are most likely to be important to the user, and thus may be assigned with a higher level of importance. For example, users tend to take pictures and videos of their kids very frequently. Sampling the footage of the user, and detecting people in it, will most probably extract image samples of the user's kids. This information enables the system to give a high level of importance to these kids even in the first session being captured by the proposed camera (assuming that such a footage can be collected in advance). It should be noted that this information may be extracted not only from footage on the device, but also from external resources such as photos from Facebook.

Finally, the user may give a rating for automatically captures photos, to indicate his or her satisfaction of the captured photos.

These preferences can be used by the system to enhance its importance level computation and the decision regarding actions to be taken. For example—if the user likes scenery shots, it may reduce the importance level given to people close-ups. Another example is the rate of automatic photos being taken, which can be adjusted to the user preferences automatically, for example—reducing the rate of the automatically taken photos is the user give these photos a low rate, or prefer to delete then rather than to save them.

External Information Sources:

In one embodiment of the present invention, the importance levels, metrics and action decisions may take into account external information, optionally a real-time information from other cameras. We describe next several such sources of external information.

Figure 13:
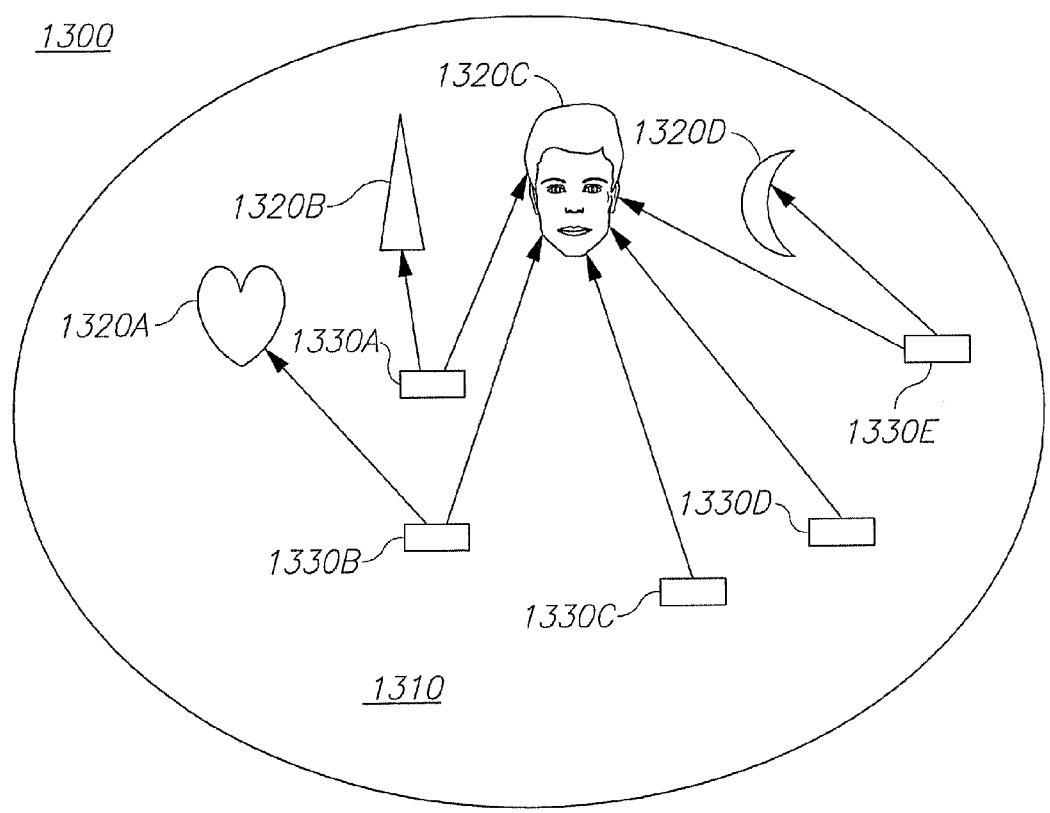
FIG. 13 is a schematic diagram illustrating an aspect in accordance with some embodiments according to the present invention.

Collaborative Capturing:

FIG. 13 is a schematic diagram illustrating a time-space 1300 in which event 1310 is a subset thereof. In collaborative capturing, multiple cameras such as 1330A, 1330B, 1330C, 1330D and 1320E are shooting footage while being present on the same event 1310. Various cameras 1330A, 1330B, 1330C, 1330D and 1320E can pass information between them, and use this information for metrics computations or action decisions. Some examples for such information may be:

Importance of objects or places in the scene. This information can be computed, for example, by doing a voting of the objects, places and activities that were captured by the users in this event. The idea is that important objects such as 1320C (e.g., a famous actor) will tend to be captured by many users, while less important objects such as 1320A, 1320B, and 1320D may be captured by only a few users in this event.

Similarly to the spatial voting described above, temporal voting can also be used—determining the "interesting" moments in which there are many capturing events (e.g., at the moment of a "goal" during a soccer event). A example for a usage of this voting is computing a metric which measures the number of votes in a given moment, and using this metric for the automatic photo capture (more votes will increase the probability of taking a photo).

Both special and temporal voting can be combined to a spatio-temporal voting, used to compute weights for objects or places at specific times.

3D information can be extracted from multiple camera that are capturing the same scene, e.g. using various of well know stereo computation algorithms. This 3D information can be used in the image analysis, e.g., for extracting objects from the background.

The collaborative capturing can be used for collaborative editing (e.g., creating edited videos which mix footage taken by multiple users). In this case, the capturing decisions may be influenced by video editing criteria for collaborative editing. For example—

Shooting multiple photos of an object from different positions, in order to compose them together in the edited video;

Selecting different camera settings for different cameras that captures the same scene, in order to obtain a variety of images or videos with different settings. For example—using different blur settings, regular vs. slow motion, Flash/No-Flash, Zoom vs. Long-Shot, etc'. This different setting can be used to improve the story telling, for example—by selecting a close-up photo after a long shot one (which is a known technique in editing of feature films).

Advantageously, since in collaborative capturing multiple cameras are shooting footage in the same event, the cameras may pass information between them. They can then use this information for metrics computations or action decisions. Some examples for such information may be:

Importance of objects or places in the scene. This information can be computed, for example, by doing a voting of the objects, places and activities that were captured by the users in this event. The idea is that important objects will tend to be captured by many users, while less important objects may be captured by only a few users in this event.

Similarly to the spatial voting described above, temporal voting can also be used—determining the "interesting" moments in which there are many capturing events (e.g., at the moment of a "goal" during a soccer event). A example for a usage of this voting is computing a metric which measures the number of votes in a given moment, and using this metric for the automatic photo capture (more votes will increase the probability of taking a photo).

Both special and temporal voting can be combined to a spatio-temportal voting, used to compute weights for objects or places in specific times.

3D information can be extracted from multiple camera that are capturing the same scene, e.g. using various of well know stereo computation algorithms. This 3D information can be used in the image analysis, e.g., for extracting objects from the background.

Statistical Learning of Importance Using Voting

Similar to the collaborative capturing, the smart camera can used a statistical external information for determining the importance of locations. A simple way to do it is using a "public" voting: assume that one could record the locations being shot for a large number of people (e.g., by all people having the same mobile camera application), and use these records to do a voting for locations. In such case, popular locations (e.g., "Eifel Tower") will get high score, and will be defined as an important location (or the Eifel Tower will be defined as an important object).

Wearable Cameras

Wearable cameras are an example for a case in which automatic capturing is important—the user may be occupied with other activities, but would still like to capture the important moments automatically. One interesting case of wearable cameras is "action-cams" (e.g., Go-Pro), where the user is wearing the camera during an activity, usually a sport activity, and would like to capture the interesting moments without destruction. Many action-cams today are shooting all the time, which may be expensive in storage and buttery. Therefore, automatic decision regarding when to capture photos or videos (or at what quality) may be very useful. In the case of a wearable camera, additional metrics may be used which are special for this case—for example: (a) a metric that is based on the motion of the user's body motion, for example—the speed of a running user, whether he is jumping, etc'. An interesting case are action-cams, where actions and body behavior may give information regarding the importance of a moment, e.g., the moment when the user is jumping is important, and should be used as a trigger for taking a photo. (b) gaze analysis—for example, giving a higher importance level to image locations that are in the direction of the gaze (c) head orientation—similar to gaze, the head orientation can indicate the direction which interests the user (d) body pressure/fast heartbeat—increased body pressure or fast heartbeat may be used as an indicator for user surprise, which may be used as an indirect trigger for good moments to take a photo, and thus may be used as metrics for automatic photo capture. In the extreme case, the camera is working all the time without any manual intervention, and all the decisions regarding automatic photo capture and camera settings are done automatically.

The special case of wearable cameras might add new challenges and opportunities to the problem automatic capturing:

Day-logging: automatically creating a log of the day (or any other period of time, e.g., week). This is a special case of the automatic video editing that was describe above, where the input is all the footage in the given period of time.

Using external information: As described in a previous paragraph, the automatic capturing can use external information such as voting. Consider for example a traveler in Paris. He may be traveling without any need to take care of taking photos, but the camera will recognizes places with high voting (i.e., places which were captured by many other people, such as the Eifel Tower), and take a photo when he reach such a place.

Another case of a wearable camera is VR (virtual-reality) helmet. In this case, the analyzed objects may be virtual objects, rather than real ones. Furthermore, the interaction with objects (which may be used as a metric for the automatic capturing), may be also an interaction between (a) two virtual objects, or (b) between the user and a virtual object. For example—a trigger for automatic photo capturing may be the event of the user passing a virtual finish-line in a running track, or hitting a virtual target in a ski track, or (c) Between a real object in the world, and a virtual object—for example—when the locations of the virtual and real objects collide (e.g., when a real person enters the virtual crosshairs of the user in a virtual shooting game).

According to some embodiments of the present invention, the camera may be configured to capture the face of the user during photo capture, analyze the facial expression or gaze of the captured face; and use the analyze meta-data as a metric. For example—prefer taking a photo when the user is smiling or surprised.

According to some embodiments of the present invention, the camera may be configured to capture the auditory signals during photo capture, analyze the auditory signals and; and use them as a metric. For example—prefer taking a photo when the user is laughing.

Figure 14:
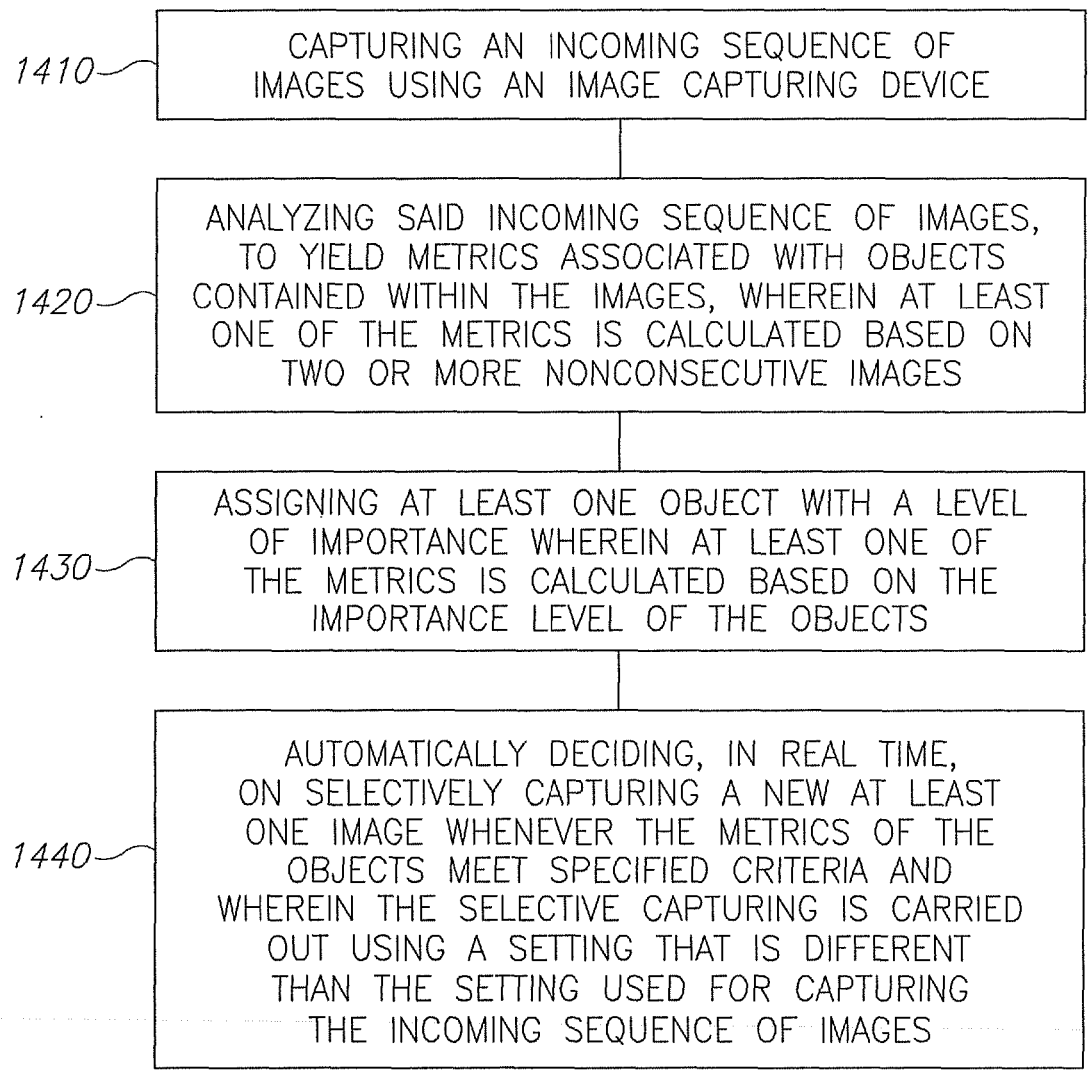
FIG. 14 is a high level flowchart illustrating a method in accordance with some embodiments according to the present invention.

FIG. 14 is a high level flowchart illustrating a generalized method 1400 summarizing several of the concepts described herein in accordance with embodiments of the present invention. Method 1400 may include the following steps: capturing an incoming sequence of images using an image capturing device 1410; analyzing said incoming sequence of images, to yield metrics associated with objects contained within the images, wherein at least one of the metrics is calculated based on two or more nonconsecutive images 1420; assigning at least one object with a level of importance, wherein at least one of the metrics is calculated based on the importance level of the objects 1430; and automatically deciding, in real time, on selectively capturing a new at least one image whenever the metrics of the objects meet specified criteria and wherein the selective capturing is carried out using a setting that is different than the setting used for capturing the incoming sequence of images 1440.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method for capturing one or more specific objects with a camera comprising:
    capturing an incoming sequence of images using an image capturing device;
    analyzing said incoming sequence of images, to yield metrics associated with objects contained within the images, wherein at least one of the metrics is calculated based on two or more nonconsecutive images;
    assigning at least one object with a level of importance and wherein at least one of the metrics is calculated based on the importance level of the specific objects; and
    automatically deciding, in real time, on selectively capturing at least one new image whenever the metrics of the specific objects meet specified criteria and wherein the selective capturing is carried out using a setting that is different than the setting used for capturing the incoming sequence of images,
    wherein the importance level for at least one of the objects is calculated based on level of representation of this object in existing images.

2. A method for capturing one or more specific objects with a camera comprising:
    capturing an incoming sequence of images using an image capturing device;
    analyzing said incoming sequence of images, to yield metrics associated with objects contained within the images, wherein at least one of the metrics is calculated based on two or more nonconsecutive images;
    assigning at least one object with a level of importance and wherein at least one of the metrics is calculated based on the importance level of the specific objects; and
    automatically deciding, in real time, on selectively capturing at least one new image whenever the metrics of the specific objects meet specified criteria and wherein the selective capturing is carried out using a setting that is different than the setting used for capturing the incoming sequence of images,
    wherein at least one of the metrics corresponds to interaction between at least two objects.

3. The method according to claim 2, wherein the user preferences include at least one of: preferred type of scene, preferred important object positions, preferred camera settings, preferred object classes, and preferred specific objects.

4. A method for capturing one or more specific objects with a camera comprising:
    capturing an incoming sequence of images using an image capturing device;
    analyzing said incoming sequence of images, to yield metrics associated with objects contained within the images, wherein at least one of the metrics is calculated based on two or more nonconsecutive images;
    assigning at least one object with a level of importance and wherein at least one of the metrics is calculated based on the importance level of the specific objects; and
    automatically deciding, in real time, on selectively capturing at least one new image whenever the metrics of the specific objects meet specified criteria and wherein the selective capturing is carried out using a setting that is different than the setting used for capturing the incoming sequence of images,
    wherein at least one of the metrics depends on at least one of: history of capturing actions of the user, and preferences of the user.

5. A method for capturing one or more specific objects with a camera comprising:
    capturing an incoming sequence of images using an image capturing device;
    analyzing said incoming sequence of images, to yield metrics associated with objects contained within the images, wherein at least one of the metrics is calculated based on two or more nonconsecutive images;
    assigning at least one object with a level of importance and wherein at least one of the metrics is calculated based on the importance level of the specific objects; and
    automatically deciding, in real time, on selectively capturing at least one new image whenever the metrics of the specific objects meet specified criteria and wherein the selective capturing is carried out using a setting that is different than the setting used for capturing the incoming sequence of images,
    wherein one of the settings for selective capturing is taking a photo burst where at least one of the photos is with flash and at least one of the photos is without flash.

6. A method for capturing one or more specific objects with a camera comprising:
    capturing an incoming sequence of images using an image capturing device;
    analyzing said incoming sequence of images, to yield metrics associated with objects contained within the images, wherein at least one of the metrics is calculated based on two or more nonconsecutive images;
    assigning at least one object with a level of importance and wherein at least one of the metrics is calculated based on the importance level of the specific objects; and
    automatically deciding, in real time, on selectively capturing at least one new image whenever the metrics of the specific objects meet specified criteria and wherein the selective capturing is carried out using a setting that is different than the setting used for capturing the incoming sequence of images, wherein at least one of the metrics corresponds to an external region data, and wherein the external region data includes at least one of: statistics of photos been taken by others, history of capturing decisions that relates to the captured object, relative position of the camera to adjacent cameras.

7. A method for capturing one or more specific objects with a camera comprising:

capturing an incoming sequence of images using an image capturing device;

analyzing said incoming sequence of images, to yield metrics associated with objects contained within the images, wherein at least one of the metrics is calculated based on two or more nonconsecutive images;

assigning at least one object with a level of importance and wherein at least one of the metrics is calculated based on the importance level of the specific objects; and automatically deciding, in real time, on selectively capturing at least one new image whenever the metrics of the specific objects meet specified criteria and wherein the selective capturing is carried out using a setting that is different than the setting used for capturing the incoming sequence of images, further comprising receiving information during capture from at least one additional camera and wherein at least one of the metrics corresponds to actions taken by at least one additional camera.

8. A method for capturing one or more specific objects with a camera comprising:

capturing an incoming sequence of images using an image capturing device;

analyzing said incoming sequence of images, to yield metrics associated with objects contained within the images, wherein at least one of the metrics is calculated based on two or more nonconsecutive images;

assigning at least one object with a level of importance and wherein at least one of the metrics is calculated based on the importance level of the specific objects; and automatically deciding, in real time, on selectively capturing at least one new image whenever the metrics of the specific objects meet specified criteria and wherein the selective capturing is carried out using a setting that is different than the setting used for capturing the incoming sequence of images, wherein the camera is a wearable camera and wherein at least one of the metrics is associated with at least one of: analysis of the body motion of the user; gaze analysis; head orientation; body pressure indicators; interaction with an augmented object.

9. A method for capturing one or more specific objects with a camera comprising:

capturing an incoming sequence of images using an image capturing device;

analyzing said incoming sequence of images, to yield metrics associated with objects contained within the images, wherein at least one of the metrics is calculated based on two or more nonconsecutive images;

assigning at least one object with a level of importance and wherein at least one of the metrics is calculated based on the importance level of the specific objects; and automatically deciding, in real time, on selectively capturing at least one new image whenever the metrics of the specific objects meet specified criteria and wherein the selective capturing is carried out using a setting that is different than the setting used for capturing the incoming sequence of images, wherein in parallel to capturing the incoming sequence of images, the face of the user is also captured, and wherein at least one of the metrics is associated with a facial analysis of the face of the user during capture.

10. A method for capturing one or more specific objects with a camera comprising:

capturing an incoming sequence of images using an image capturing device;

analyzing said incoming sequence of images, to yield metrics associated with objects contained within the images, wherein at least one of the metrics is calculated based on two or more nonconsecutive images;

assigning at least one object with a level of importance and wherein at least one of the metrics is calculated based on the importance level of the specific objects; and automatically deciding, in real time, on selectively capturing at least one new image whenever the metrics of the specific objects meet specified criteria and wherein the selective capturing is carried out using a setting that is different than the setting used for capturing the incoming sequence of images, wherein a criterion for importance is the amount of users capturing at least one object at a common event.

* * * * *